3,629,140
WATER SOLUBILIZATION OF VANADYL-HARDENED POLY(VINYL ALCOHOL) FILMS USEFUL AS CAPSULE WALL MATERIAL
Robert G. Bayless, Yellow Springs, Donald D. Emrick, Kettering, and Ronald L. Hart, Dayton, Ohio, assignors to The National Cash Register Company, Dayton, Ohio
No Drawing. Filed July 14, 1969, Ser. No. 841,596
Int. Cl. B01j *13/02;* B44d *1/02, 1/44*
U.S. Cl. 252—316                            15 Claims

ABSTRACT OF THE DISCLOSURE

A process is disclosed for manufacturing, en masse, minute capsules having walls which are cold water soluble. More specifically disclosed is a process for treating already-formed capsule walls comprising water-insolubilized vanadyl(IV)-hardened poly(vinyl alcohol), wherein the vanadyl ions are oxidized to a valence number such that the vanadium no longer serves to render the poly(vinyl alcohol) water insoluble. In one disclosed embodiment, dry walled capsules which had previously been vanadyl(IV)-hardened are treated by oxidizing the vanadium so that the thus-treated capsule walls are soluble, on later contact, with cold water. In other embodiments, oxidizing materials are used in combination with the water-insolubilized capsule wall material to render the vanadyl(IV)-hardened capsule wall material water soluble upon first contact of water with the combination of materials. The polymeric capsule wall material which is disclosed in the present invention is poly(vinyl alcohol) polymeric material which has been initially insolubilized by complexing with hydrous vanadyl(IV) compounds.

BACKGROUND OF THE INVENTION

Field of the invention

This invention relates to a method for preparing minute capsules, en masse, in an aqueous capsule manufacturing vehicle wherein the capsule wall material comprises poly(vinyl alcohol). The invention more specifically pertains to a process wherein poly(vinyl alcohol)-walled capsules which have previously been hardened by hydrous vanadyl(IV) compounds are treated to render the poly(vinyl alcohol) material water soluble once again. The poly(vinyl alcohol)-walled capsules can be manufactured by any of several previously known capsule manufacturing processes of the prior art. Those poly(vinyl alcohol)-walled capsules which are eligible for treatment by the process of the present invention include poly(vinyl alcohol) polymeric material which has been chemically hardened using hydrous vanadyl(IV)-containing compounds. The product of reaction between poly(vinyl alcohol) and hydrous vanadyl compounds is substantially water insoluble and provides capsule wall material which will not dissolve or disintegrate in water and which exhibits a substantial degree of impermeability for materials contained within such capsule walls.

An important aspect of the present invention is considered to reside in the discovery that the vanadyl(IV) moiety of the cross-linked poly(vinyl alcohol) complex can be oxidized, in situ, in the hardened poly(vinyl alcohol) capsule wall material, to render the vanadium inactive in its reaction with the poly(vinyl alcohol). The previously water soluble poly(vinyl alcohol) is, thereby, rendered water soluble again.

"Solution" used hereinafter, means a true solution, a colloidal sol, or a colloidal dispersion.

Description of the prior art

U.S. patent application Ser. No. 701,128, filed Jan. 29, 1968, in the name of Robert G. Bayless, one of the inventors named herein, and assigned to the assignee herein, discloses and claims a process for manufacturing minute capsules which have walls comprising poly(vinyl alcohol) polymeric material in complexed combination with polyhydroxy aromatic compounds such as resorcinol or gallic acid. The process of the invention of that patent application utilizes a liquid-liquid-phase-separation-inducing material to cause emergence, from solution in the manufacturing vehicle, of a liquid phase rich in poly(vinyl alcohol)/polyhydroxy-aromatic-compound complex. The separated liquid phase is disclosed therein to wet and enwrap dispersed particles of intended capsule core entities to, thereby, yield capsules. Optionally, initially water soluble capsule walls manufactured by the above-described process can be hardened to water insolubility by treatment with hydrous vanadyl(IV) compounds. Those hardened capsule walls can later be treated by the process of the present invention to reestablish water solubility of the poly(vinyl alcohol).

U.S. patent applications Ser. Nos. 701,127 and 701,130, filed Jan. 29, 1968, now Pat. 3,565,818 in the names of Robert G. Bayless and Donald D. Emrick, the inventors named herein, and assigned to the assignee herein, disclose methods for producing minute capsules having capsule walls comprising a poly(vinyl alcohol)/alkylene glycol cyclic borate ester complex. The capsule wall material of the above-mentioned Bayless and Emrick applications are caused to emerge, either by liquid-liquid-phase-separation, or by interfacial reaction, from an aqueous manufacturing medium. The complexing is disclosed to be caused by partial cross-esterification of hydroxyl groups on the poly(vinyl alcohol) molecules with a difficulty hydrolyzable 1,3- or 2,4-alkylene glycol cyclic borate ester. Optionally, initially water soluble capsule walls manufactured by the above-described process can be hardened to water insolubility by treatment with hydrous vanady(IV) compounds. Those hardened capsule walls can later be treated by the process of the present invention to reestablish water solubility of the poly(vinyl alcohol).

U.S. Pat. Nos. 3,258,422, issued June 28, 1966; 3,264,245, issued Aug. 2, 1966; and 3,265,657, issued Aug. 9, 1966, all on the application of Harold Sinclair, disclose formation of a rigid gel from a solution of poly(vinyl alcohol) by treatment of the poly(vinyl alcohol) with metallic ions, such as vanadium, titanium or chromium. The rigid gels formed by the above Sinclair inventions are of a gross nature, that is, an entire, continuous, mass of poly(vinyl alcohol) solution is homogeneously, rigidly, gelled as a single phase. There is no indication in the Sinclair patents that the poly(vinyl alcohol), once gelled, can be ungelled.

U.S. patent application Ser. No. 701,129, filed Jan. 29, 1968, in the name of Donald D. Emrick, one of the inventors named herein, and assigned to the assignee herein, discloses that water soluble poly(vinyl alcohol) polymeric material, as preformed capsule walls, can be chemically hardened and rendered relatively water-insoluble by treatment with hydrous vanadyl(IV) compounds in an aqueous liquid.

SUMMARY OF THE INVENTION

The present invention pertains to a treatment for preformed capsule walls of relatively water insoluble polymeric material to render those capsule walls relatively more water soluble. The invention more particularly relates to a treatment process wherein one component of the capsule wall materials is oxidized in order to cancel its previous function of hardening the capsule wall material. The invention specifically pertains to a treatment of vanadyl(IV)-hardened poly(vinyl alcohol) capsule wall material to oxidize substantially all of the vanadium to an oxidation number above +4. Such oxidation of the vanadyl(IV) effectively "unhardens" the poly(vinyl alcohol) material by reversing the water insolubilizing chemical reaction between the vanadium compound and the poly(vinyl alcohol) material.

Capsule walls which are soluble in relatively cold water find special utility in many applications. Flavoring or fragrancing material can be encapsulated for future release wherein the capsules only need be dispersed in cold water. Previously known capsules require rupture or dispersion in hot water. Encapsulated flavoring can now be used in preparation of gelatin desserts or other foods at room temperature or below without the use of heat. Fertilizers, rodenticides, insecticides, and other poisons, chemical reactants, pharmaceuticals, and veterinarian medicines and many other materials can be encapsulated; and those capsules can then be subjected to treatment of the present process. In any case, and wherever there is a condition of utility requiring cold water solubility or solubility in water and at a lower temperature than has in the past been available, the treatment of this invention finds use.

Another use for treated capsule wall material of the present invention includes capsules which contain materials of detergent formulations, such as detergent-fragrances, inert essential oils, brightener materials, or enzymes or other active detergent components. A preferred embodiment of the present invention includes water soluble capsules for use in commercial or home laundry detergent formulations, wherein fragrances, intensifiers, inert essential oils, brighteners, enzymes or the like, are encapsulated, and combined with other, powdered, components of the detergent product. The present invention provides a process which yields capsules having walls which are readily soluble, or disintegratable through a very high degree of swelling, in cold water by treating capsules which were previously easily manufactured and readily isolated from an aqueous capsule manufacturing medium and which were, at the time of manufacture, not soluble or disintegratable in the water of the manufacturing medium.

Simply expressed, the present invention accomplishes a reversal or cancellation of the above-discussed vanadyl-(IV)-poly(vinyl alcohol) chemical hardening reaction. That reversal reaction frees the poly(vinyl alcohol) from being complexed so that it can again display cold water solubility, or can, at least, exhibit sufficient swelling in water to cause effective disintegration of the capsule wall within a reasonable time at temperatures of approximately 25 degrees centigrade or thereabouts. The reversal or cancellation of the poly(vinyl alcohol) hardening associated with the vanadyl(IV)-poly(vinyl alcohol) complex is accomplished by using an oxidizing material to oxidize substantially all of the poly(vinyl alcohol)-combined vanadyl functionality (V+4 oxidation number) to a vanadate functionality (V+5 oxidation number) which vanadate-(V) functionality is substantially inactive or, at least, very much less active than vanadyl(IV) in poly(vinyl alcohol) cross-linking and, therefore, in hardening and insolubilizing poly(vinyl alcohol) polymeric materials. It should be understood, of course, that pre-formed films containing initially water soluble poly(vinyl alcohol) complexed with hydrous vanadyl(IV) compounds can also be treated by the process of the present invention. Although some practical differences exist between films or sheets of poly-(vinyl alcohol)-containing material and minute capsule walls comprising poly(vinyl alcohol) material, both films and capsule walls, can be treated by the process of the present invention.

An important feature of the present invention resides in the discovery that already-formed capsule walls of vanadyl(IV)-complexed poly(vinyl alcohol) polymeric material can be treated to render those pre-formed, hardened, capsule walls soluble in water maintained at a relatively low temperature.

It is an object of the present invention to "unharden" vanadyl(IV) complexed poly(vinyl alcohol) polymeric material films, that is, it is an object to reverse the complexing of hydrous vanadyl(IV) compounds with initially water soluble poly(vinyl alcohol) polymeric material which complexing renders the poly(vinyl alcohol) substantially water insoluble. It is specifically an object of the present invention to "unharden" such poly(vinyl alcohol)-vanadyl(IV) complexes, when the poly(vinyl alcohol) is present in the form of walls of minute capsules. It is more specifically an object of the present invention to oxidize the above-mentioned vanadyl(IV) compounds to an oxidation number wherein the vanadium no longer renders the poly(vinyl alcohol) material water insoluble (that is, vanadate, V+5 oxidation number).

It is a specific and particular object of the present invention to manufacture capsules having walls comprising poly(vinyl alcohol) and enclosing material to be released or material releasable in cold water. The process for manufacturing the poly(vinyl alcohol)-walled capsules includes, as an early step, hardening the poly(vinyl alcohol) present by using hydrous vanadyl(IV) compounds to yield capsule walls which permit ease in isolation of the capsules and separation of those capsules from an aqueous manufacturing vehicle. The process for manufacturing also includes, as a later step, what is considered to be the kernel of the present invention and that is, oxidizing the poly(vinyl alcohol)-hardening vanadium-(IV) to a relatively poly(vinyl alcohol)-inactive vanadium state(V) to return the initially water soluble poly-(vinyl alcohol) polymeric material to a water soluble condition.

Other objects will, in part, be disclosed hereinbelow and will, in part, be apparent to those skilled in the art having the benefit of this present teaching.

The term "poly(vinyl alcohol)" as used herein is to be understood as referring to polymeric material in which at least 50 percent, by weight, thereof, is composed of vinyl alcohol constituent. The term refers to polymeric materials, all of which are composed of vinyl alcohol constituents and also to polymeric material containing not only vinyl alcohol consituents but also vinyl acetate (and/or propionate and/or butyrate) constituents providing that the vinyl alcohol constituents make up at least about 50 percent, by weight, of the polymeric material. The poly-(vinyl alcohol) most often used in practice of this invention is generally any water soluble commercial variety and is the hydrolysis product of poly(vinyl acetate). Poly(vinyl alcohol) representing poly(vinyl acetate) which has been hydrolyzed to an extent of about 77 to 99 percent, by weight, is eligible for use, although poly-(vinyl alcohol) having a lower or higher degree of hydrolysis can be used provided that such poly(vinyl alcohol) is readily water soluble.

Preferred for use in the present invention are poly-(vinyl alcohol) materials, commercially available, which have a moderately high molecular weight and, as a result, good film-forming properties; and which are readily dissolved or uniformly colloidally dispersed by cold water. Such cold water soluble poly(vinyl alcohol) materials generally contain from about 10 to about 20 percent, by weight, of unhydrolyzed acetate groups, remaining from an incomplete alkaline saponification or hydrolysis of the parent poly(vinyl acetate) commercial starting material.

Capsules particularly useful in practice of the present invention include capsules having poly(vinyl alcohol) as one component capsule wall material and made by a process of liquid-liquid phase separation including the step of establishing an agitated three-phase, aqueous liquid system, comprising poly(vinyl alcohol), polyhydroxy aromatic material, and phase-separation-inducing material in an aqueous vehicle with particles of intended capsule core entities. The intended capsule core entities must be substantially insoluble in the vehicle. The system is agitated yielding a first phase which is the aqueous liquid vehicle, a second phase which is capsule wall material of poly(vinyl alcohol)/polyhydroxy aromatic material complex, and a third phase which consists of the capsule core entities. The agitation results in capsules being formed, the walls of which are gelled or set by adding an aqueous salt solution to the system to cause contraction or partial dehydration of the capsule wall material. The capsule walls are then treated by an aqueous solution of a hydrous vanadyl(IV) compound which is water soluble at an adjusted pH of about 3–8. The vanadyl(IV) treatment crosslinks the poly(vinyl alcohol)/polyhydroxy aromatic material walls and renders them substantially more water insoluble or nondisintegratable in water. Eligible polyhydroxy aromatic materials include catechol, resorcinol, 4-hexylresorcinol, pyrogallol, gallic acid, tannic acid, and the like.

Capsules also useful for practicing the process of the present invention includes those wherein an alkyl-branched alkylene glycol cyclic borate ester is substituted for the polyhydroxy aromatic material of the paragraph above. The capsule wall material of those capsules comprises a complex of poly(vinyl alcohol) and the alkylene glycol cyclic borate ester. The complex between poly(vinyl alcohol) and the cyclic borate ester can be accomplished either as a liquid-liquid phase separation or as an interfacial reaction between poly(vinyl alcohol) in solution in one phase and the cyclic borate ester dissolved in a liquid in a second phase—one of the two phases being a liquid of intended capsule internal phase material. Alkyl-branched alkylene glycol cyclic borate ester materials which are particularly preferred for complexing with poly(vinyl alcohol) in eventual practice of the present invention includes those cyclic borate esters which form six membered rings and are difficultly hydrolyzable to alkylene glycols. Specific examples of the glycol borate ester materials useful in manufacturing these capsules include mono (2-methyl-2,4-pentanediol) monoborate, bis-(2-methyl-2,4-pentanediol) diborate, and tris (2-ethyl-1,3-hexanediol) diborate.

The above-described poly(vinyl alcohol)-walled capsules are treated, in their manufacture, using various water soluble vanadyl(IV) salts to chemically harden or further complex the poly(vinyl alcohol) wall material. Examples of the vanadyl(IV) salts eligible for use in the further hardening process include aqueous systems of vanadyl formate, vanadyl acetate, vanadyl sulphate, or vanadyl halides. The capsule wall material treated by the vanadyl salts display decreased water solubility, decreased swelling in water, and decreased sensitivity to high humidity, relative to the same poly(vinyl alcohol) material in the absence of the vanadyl complexing or further hardening reaction treatment. Such decreased effects by water, while important in some steps of manufacture of capsules, are just the effects which are intended to be counteracted by the process of the present invention. That is, in some applications for poly(vinyl alcohol)-walled capsules it is desired or required that the capsule wall material be cold water soluble. The present invention permits reversal of the vanadyl hardening or cross-linking reaction so that the capsules can be used to release their contents on immersion in cold water.

Capsules eligible for treatment by the process of the present invention are not limited by material contained therein. The eligibility of a material contained in capsules which are to be treated by the process of the present invention depends only on the criteria of eligibility for the material to be encapsulated—those criteria being low water solubility, and relative chemical inertness to the poly(vinyl alcohol) polymeric material. Included as merely a few examples of the vast number of materials which can be contained in capsules treated by the novel process are inorganic solids, such as water-insoluble salts and oxides, pigments, and minerals; organic solids such a water-insoluble polymeric materials, high molecular-weight fats and waxes; and other materials, including insecticides, rubbers, adhesives, catalysts, and the like; and liquids such as toluene, xylene, benzene, carbon tetrachloride, silicone fluids, peppermint oil, benzyl benzoate, methyl salicylate, benzyl salicylate, amyl salicylate, lemon oil, mineral oil, and the like.

The size of the capsules or thickness of film eligible to be treated by the process of the present invention is limited only by the process used for manufacturing the capsules or the complexed poly(vinyl alcohol) film— any thickness or size of complexed poly(vinyl alcohol) film or capsule wall material being eligible for treatment. It is only required that, for an increased thickness of poly(vinyl alcohol) material, a longer treatment time might be necessary in order that substantially all of the vanadyl(IV) material can be oxidized to reverse the complexing reaction with the poly(vinyl alcohol). Minute capsules eligible for treatment by the present invention can have a size of from a few microns to several thousand microns—5 to as much as 15,000 microns or more being eligible sizes—5 to 5,000 microns being more usually and preferredly treated.

In a generalized description of an embodiment of the practice of this invention, vanadyl(IV) complexed and cross-linked poly(vinyl alcohol) capsule wall material can be treated either in an aqueous slurry of the capsules to be treated or as isolated, wet-walled capsules, capsule aggregates, capsule-containing films, or, as is more probably the case, as a re-suspension of the preformed and previously isolated capsules in a new aqueous vehicle—not the manufacturing vehicle. The capsules, usually in one of the above-described forms, are exposed to an appropriate oxidizing environment, either gaseous or liquid in form—the oxidizing environment having oxidizing materials sufficient to satisfactorily oxidize substantially all of the vanadyl(IV) vanadium to higher oxidation number vanadate(V) vanadium. A liquid oxidizing environment usually utilized is simply an aqueous solution or suspension of oxidizing materials.

In practice of the present invention, wherein the poly (vinyl alcohol) material to be treated is a complex of poly(vinyl alcohol) with polyhydroxy aromatic materials cross-linked with vanadyl(IV) vanadium, the poly(vinyl alcohol)-based capsule wall material can be treated in any of the following ways:

(a) An isolated mass of individual capsules can be treated for a prolonged period of time as a tumbling mass or as an agitated multitude of capsules in a fluidized bed utilizing a gaseous mixture of air and the vapors of either ammonia, or a volatile amine as a fluidizing medium;

(b) An agitated multitude of individual capsules can be treated by adding vapors of hydrogen peroxide to the air and ammonia combination utilized in (a) above;

(c) An agitated system of isolated capsule masses or a dispersion of the capsules in water to form a slurry can be treated by contacting the poly(vinyl alcohol) with a diluted aquous solution of hydrogen peroxide, and maintaining the contact for a time sufficient to oxidize substantially all of the vanadyl(IV) vanadium;

(d) An aqueous solution of sodium hypochlorite or N-halogenated amine, imide, or amide such as N-chloro-p-toluenesulfonamide, or N,N - dichlorosulfonamido-p-benzoic acid or water soluble salts of the above amines, imides and amides can also be used in treating vanadyl (IV)-hardened poly(vinyl alcohol) instead of the aqueous hydrogen peroxide solutions above; and (e) An established system of isolated capsule masses or aqueous slurry of vanadyl(IV)-hardened poly(vinyl alcohol)-walled capsules can be treated by an aqueous mixture of sodium perborate and mannitol; the mannitol being necessary to selectively complex and, thereby, sequester borate ion which is produced during the oxidation of the vanadyl(IV) vanadium. Free borate, if unsequestered, will complex with the now water-soluble poly (vinyl alcohol) and render it again non-water soluble. In the treatment of vanadyl(IV) hardened poly(vinyl alcohol) material, according to the practice of the present invention, any perborate oxidizing material must be accomplished, in its use, with a polyhydroxyl-containing borate-sequestering material—the borate-sequestering being necessary, as above-described, to maintain continued water solubility of the uncomplexed poly(vinyl alcohol).

In practice of the present invention using poly(vinyl alcohol) films or capsule wall materials, which have been complexed with alkylene cyclic borate ester materials, as above-described, or poly(vinyl alcohol) which has been complexed with other borates or borate salts such as sodium borate (borax), any of the above-described types of oxidation reactions can be used. In addition, however, a sufficient quantity of polyhydroxylated boron- or borate-sequestering material must be used in addition to the vanadium oxidizing agent, to selectively complex substantially all of the freed borate.

With the above objects and description in mind, specific, preferred, embodiments will now be disclosed, from which further features of the invention will become apparent to those skilled in the art. It is understood that the use of specific materials in the following examples serves an illustrative purpose and is not intended to limit the scope of the invention.

DESCRIPTION OF PREFERRED EMBODIMENTS

In order to provide a complete disclosure, a process for preparing poly(vinyl alcohol)-walled capsules will be described below, in addition to a description of the treatment process of the present invention. It should be understood that what is considered to be inventive and amount to an advance in the art, is the treament of he vanadyl(IV) complexed poly(vinyl alcohol)-containing capsule walls to render the initially water soluble poly (vinyl alcohol) again water soluble. The invention resides in a novel method for the manufacture of water soluble poly(vinyl alcohol)-walled capsules.

EXAMPLE A

In this example, capsules are prepared by an encapsulation process wherein the capsule wall material is vanadyl(IV)-hardened poly(vinyl alcohol) complexed with resorcinol. The phase-separation-inducing-material is sodium sulphate. Commercially available, substantially water insoluble, peppermint oil is used as the capsule internal phase.

Into a vessel having a capacity of about 1-liter and equipped for agitation and heating, were placed 150 milliliters of 5 percent, by weight, aqueous solution of poly (vinyl alcohol). The poly(vinyl alcohol) solution was prepared as follows: 7.5 grams of about 125,000-molecular weight poly(vinyl alcohol), characterized by having a viscosity of about 35 to about 45 centipoises in a 4 percent, by weight, aqueous solution at 20 degrees centigrade and by being 87 to 89 percent hydrolyzed (such as the material designated as "Elvanol 50-42" sold by E. I. du Pont de Nemours and Co., Wilmington, Del., United States of America), were dissolved in enough water to make a total volume of 150 milliliters of solution. Agitation was begun in the system and 50 milliliters of the peppermint oil was added. The agitation was adjusted to yield 1,000- to 1,500-micron droplets of the liquid internal phase. One hundred milliliters of 5 percent, by weight, aqueous solution of resorcinol and 100 milliliters of distilled water were then added directly to the above agitating system and the system was heated to about 40 degrees centigrade over a duration of a few minutes to allow formation of the poly(vinyl alcohol)/resorcinol complex, some of which emerges from solution as a coacervate. The partially phased-out complex wetted and wrapped the dispersed particles of intended internal phase material to yield embryonic liquid-walled capsules and; two hundred milliliters of 10 percent, by weight, aqueous solution of sodium sulfate solution was then slowly added while the agitating system was permitted to cool to room temperature. The addition of sodium sulfate solution caused more complete liquid-liquid phase separation of the poly(vinyl alcohol)-containing complex. Finally, 100 milliliters of 5 percent, by weight, aqueous vanadyl(IV) sulfate dihydrate solution and 10 milliliters of concentrated aqueous ammonia solution were added to the system to adjust the pH to about 5.0 just before use, to chemically cross-link the poly(vinyl alcohol) with the hydrous vanadyl(IV) compound. The capsules, now with solid, hardened, walls were separated from the manufacturing vehicle by filtering and the capsule walls were dried by placing the capsules in the draft of a forced air blower to produce free-flowing, apparently dry, individual capsules which would yield liquid peppermint oil when ruptured.

These capsules, when redispersed in water, release very little or none of the contained peppermint oil even when the water is heated to more than 60 degrees centigrade, over a long period of time.

EXAMPLE B

The above encapsulation process was repeated with the exception that, this time, 50 milliliters of benzyl benzoate was substituted for the 50 milliliters of peppermint oil as the encapsulated internal phase core material. Otherwise, the same material in the above-indicated quantities were used.

EXAMPLE C

The Example A, above, was repeated with the exception that, this time, 50 milliliters of amyl salicylate was substituted for the 50 milliliters of peppermint oil using otherwise the same materials in the above-identified quantities.

Capsules produced in the above Examples A, B and C have substantially water insoluble capsule walls which release very little or none of the internal phase when the capsules are redispersed in water, even when the water is heated to temperatures of more than 60 degrees centigrade.

Example 1

In this example, vanadyl(IV)-hardened poly(vinyl alcohol)-walled capsules having dry walls are re-suspended (dispersed) into an aqueous oxidizing solution and it is demonstrated that the capsule walls become water soluble.

Into each of three separate vessels fitted with mechanical stirrers and external heating, were placed 500 milliliters of distilled water, about 2.5 milliliters of a commercially available oxidizing solution (an aqueous solution containing 5.25 percent, by weight, of sodium hypochlorite and sold under the trade name of "Chlorox" by the Chlorox Company, Oakland, Calif., U.S.A.) and 0.9 gram of the above-described dry, isolated capsules containing (A) peppermint oil, (B) benzyl benzoate, and (C) amyl salicylate, respectively. Liquid in the three individual beakers was then gently agitated at the below-indicated temperatures until the capsule core material was released by solution of the capsule walls. Results from the test are summarized in the table below. The capsules were approximately 1,000–1,500 microns in diameter and contained approximately 87–89 percent, by weight, of fragrance material.

| Internal phase material | Time required for capsule wall solution, minutes | | |
|---|---|---|---|
| | 23° C. | 39-40° C. | 56° C. |
| (A) Peppermint oil | 50 | 20 | 12 |
| (B) Benzyl benzoate | 15 | 7 | 6.5 |
| (C) Amyl salicylate | 15 | 7 | 6.5 |

Example 2

In this example, 250 milliliters of distilled water, 20 milliliters of commercially available, 3 percent, by weight, aqueous hydrogen peroxide solution and 0.9 gram of the benzyl benzoate-containing capsules (above (B), identified), were slowly stirred in a vessel at approximately 25 degrees centigrade. The time required for the fragrant internal phase material to be at least partially released from disintegrated capsule walls of poly(vinyl alcohol) was about 7 to 10 minutes.

Example 3

In this example, dry, isolated, vanadyl(IV) complexed, poly(vinyl alcohol)-walled capsules were treated in a gaseous oxidizing medium. Approximately 25 grams of the benzyl benzoate-containing capsules (Example B) were placed in a glass chamber and were contacted for about 64 hours with a mixture of moist vapors of ammonia, hydrogen peroxide, and air at about room temperature (20-25 degrees centigrade). The glass chamber was occasionally shaken to provide some agitation. During the course of the oxidation treatment, the original gray-green color of the capsule wall material was slowly transformed to an off-white or very pale beige color. At the end of the oxidation treatment, the slightly moist capsules were blown with dry air for approximately 30 minutes and then 0.9 gram of the treated capsules were dispersed, as in the above examples, in 500 milliliters of distilled water. The approximate time required for substantial release of most of the capsule core material was about 80 minutes at 23 degrees centigrade and about 15 minutes at 55 degrees centigrade.

EXAMPLE D

In this example capsules are manufactured wherein the capsule wall material is a complex of poly(vinyl alcohol) and an alkylene glycol cyclic borate ester.

Into a vessel having a capacity of approximately 1,500 milliliters and equipped for agitation and heating, were placed 200 milliliters of 11 percent, by weight, aqueous gum arabic solution, 20 milliliters of 14 percent, by weight, aqueous acetic acid solution, 10 grams of solid urea to serve as an anti-aggregation agent, 150 milliliters of 5 percent, by weight, aqueous poly(vinyl alcohol) solution, of a kind described hereinabove in Example A, and a finely-divided slurry of 10 grams of mono(2-methyl-2,4-pentanediol) monoborate (a reaction product, with removal of water, of 2-methyl-2,4-pentanediol and boric acid) with 50 milliliters of distilled water. The mixture was agitated until substantially all lumps of the alkylene glycol cyclic borate ester were dissolved and until a fluid, separated phase, had been produced in the aqueous vehicle. At that time, 75 milliliters of benzyl benzoate, the capsule core material internal phase for this example, was added and the rate of agitation was adjusted to produce droplets of approximately 500 to 1,000 microns in diameter. Agitation was continued for about 1.5 hours during which time the separated liquid phase wetted and wrapped the dispersed benzyl benzoate droplets to form liquid-walled capsules. Next, in order to shrink and partially dehydrate the fluid capsule walls, 160 milliliters of 7.5 percent, by weight, aqueous sodium sulfate solution was added dropwise with gentle stirring over a period of about 50 minutes. The resultant capsules were then hardened by adding to the system 100 milliliters of a solution of 5.0 grams of vanadyl(IV) sulfate dihydrate in 7.5 percent, by weight, aqueous sodium sulfate solution, with adjustment of the final pH to approximately 4.7 by adding concentrated aqueous ammonia solution just before use. The vanadyl-hardened capsules were then recovered by filtration, washed with several changes of water, and were placed in the draft of a forced air blower to dry the capsule walls.

The capsules produced in this Exampel D have substantially water insoluble capsule walls which release very little or none of the internal phase when the capsules are redispersed in water, even when the water is heated to temperatures of more than 60 degrees centigrade.

Example 4

Into a vessel equipped with a mechanical stirrer. were placed 250 milliliters of distilled water, 2.5 grams of mannitol to serve as polyhydroxy borate sequestering agent, 0.9 gram of the capsules produced in Example D, above, and 3 milliliters of a commercially available oxidizing agent (5.25 percent, by weight, aqueous sodium hypochlorite solution as sold under the trade name "Clorox," above identified). At a temperature of approximately 25 degrees centigrade, the capsule wall material either disintegrated or dissolved to such an extent that substantially all of the internal phase material was released in a duration of less than 10 minutes.

Example 5

Into a vessel equipped as above were placed 250 milliliters of distilled water, 5 grams of mannitol, 1.0 grams of the above-isolated vanadyl(IV) cross-linked capsules, and 2 grams of sodium perborate. Within a few minutes, at approximately 25 degrees centigrade, capsule walls of these dispersed capsules had disintegrated or dissolved to a sufficient extent to release substantially all of the encapsulated liquid core material.

Included among polyhydroxy borate sequestering agents eligible for use in the process of the present invention are: mannitol, sorbitol, glycerol, pentaerythritol, 1,1,1-tris(hydroxymethyl)ethane, and mannose.

It should be understood that the particular kind of poly(vinyl alcohol) and the particular materials contained within the capsules do not limit what is considered to be the process of this invention. Capsules can be treated by the process of this invention having, as capsule wall material, any poly(vinyl alcohol) as above-defined and containing any intended internal phase material which otherwise meets the criteria for encapsulation.

What is claimed is:

1. A process for rendering substantially water insoluble, preformed, films of vanadyl(IV)-hardened poly(vinyl alcohol) substantially water soluble, the process including the steps of:
    (a) contacting the film with an oxidizing material;
    (b) maintaining the contact for a time sufficient to oxidize substantially all of the vanadyl(IV) vanadium to vanadium having an oxidation number greater than +4
whereby the poly(vinyl alcohol) becomes unhardened and water soluble.

2. The process of claim 1 wherein the oxidizing material includes at least one material selected from the group of materials consisting of oxygen-containing gas and gas containing hydrogen peroxide vapors.

3. A process for dissolving, in aqueous liquid, a substantially water insoluble film of vanadyl(IV)-hardened poly(vinyl alcohol) comprising the steps of:
    (a) contacting the film with an oxidizing material;
    (b) maintaining the contact for a time sufficient to oxidize substantially all of the vanadyl(IV) vanadium to vanadium having an oxidation number greater than +4; and
    (c) contacting the film having the oxidized vanadium with aqueous liquid to dissolve the poly(vinyl alcohol).

4. A process for rendering substantially water insoluble, preformed, capsule wall films of vanadyl(IV)-hardened poly(vinyl alcohol), en masse, substantially water soluble, the process including the steps of:
    (a) contacting the capsule wall films with a vanadyl(IV) oxidizing material;
    (b) maintaining the contact for a time sufficient to oxidize substantially all of the vanadyl(IV) vanadium to vanadium having an oxidation number greater than +4
whereby the poly(vinyl alcohol) becomes unhardened and water soluble.

5. The process of claim 4 wherein the oxidizing material includes at least one material selected from the group of materials consisting of oxygen-containing gas and gas containing hydrogen peroxide vapors.

6. A process for dissolving, in aqueous liquid, en masse, substantially water insoluble capsule wall films of vanadyl(IV)-hardened poly(vinyl alcohol) comprising the steps of:
 (a) contacting the films with a vanadyl(IV) oxidizing material;
 (b) maintaining the contact for a time sufficient to oxidize substantially all of the avnadyl(IV) vanadium to vanadium having an oxidation number greater than +4; and
 (c) contacting the film having the oxidized vanadium with aqueous liquid to dissolve the poly(vinyl alcohol).

7. A process for manufacturing, en masse, minute capsules having water soluble polymeric capsule wall material comprising the steps of:
 (a) establishing an agitated multitude of minute capsules having substantially water insoluble capsule walls including vanadyl (+4 oxidation number) hardened poly(vinyl alcohol) as polymeric capsule wall material;
 (b) contacting the agitating multitude of capsules with an oxidizing material; and
 (c) maintaining the contact for a time sufficient to oxidize substantially all of the vanadyl vanadium to an oxidation number greater than +4.

8. The process of claim 7 wherein the oxidizing material includes at least one material selected from the group of materials consisting of oxygen-containing gas and gas containing hydrogen peroxide vapors.

9. The process of claim 7 wherein the oxidizing material is an aqueous solution and includes, in solution, at least one material selected from the group of materials consisting of hydrogen peroxide, sodium hypochlorite and sodium perborate.

10. A process for manufacturing, en masse, minute capsules having water soluble polymeric capsule wall material comprising the steps of:
 (a) establishing an agitated liquid dispersion of minute capsules having substantially water insoluble capsule walls including vanadyl(+4 oxidation number) hardened poly(vinyl alcohol) as polymeric capsule wall material;
 (b) contacting the agitating liquid dispersion of capsules with an oxidizing material; and
 (c) maintaining the contact for a time sufficient to oxidize substantially all of the vanadyl vanadium to an oxidation number greater than +4.

11. A process for manufacturing, en masse, minute capsules having substantially water soluble polymeric capsule wall material comprising the steps of:
 (a) establishing an agitated liquid disperson of minute capsules having substantially water insoluble capsule walls including vanadyl(IV) hardened poly(vinyl alcohol) complexed with a borate ester selected from the group consisting of 1,3-alkylene glycol cyclic borate esters and 2,4-alkylene glycol cyclic borate esters;
 (b) contacting the substantially water insoluble capsule wall material with a polyhydroxyl, borate-sequestering, material and an oxidizing material; and
 (c) maintaining the contact for a time sufficient to oxidize substantially all of the vanadyl(IV) vanadium and sequester the borate.

12. The process of claim 11 wherein the oxidizing material includes an aqueous perborate solution.

13. The process of claim 1 wherein the oxidizing material includes at least one material selected from the group of materials consisting of gas containing oxygen and amine vapors, gas containing oxygen and ammonia vapors, gas containing hydrogen peroxide vapors and amine vapors, and gas containing hydrogen peroxide vapors and ammonia vapors.

14. The process of claim 4 wherein the oxidizing material includes at least one material selected from the group of materials consisting of gas containing oxygen and amine vapors, gas containing oxygen and ammonia vapors, gas containing hydrogen peroxide vapors and amine vapors, and gas containing hydrogen peroxide vapors and ammonia vapors.

15. The process of claim 7 wherein the oxidizing material includes at least one material selected from the group of materials consisting of gas containing oxygen and amine vapors, gas containing oxygen and ammonia vapors, gas containing hydrogen peroxide vapors and amine vapors, and gas containing hydrogen peroxide vapors and ammonia vapors.

References Cited

UNITED STATES PATENTS

| | | | |
|---|---|---|---|
| 2,455,790 | 12/1948 | Malm et al. | 424—33 |
| 2,886,445 | 5/1959 | Rosenthal et al. | 99—135 |
| 3,264,245 | 8/1966 | Sinclair | 252—316 X |
| 3,415,758 | 12/1968 | Powell et al. | 252—316 |

FOREIGN PATENTS

| | | | |
|---|---|---|---|
| 929,404 | 6/1963 | Great Britain | 252—316 |

RICHARD D. LOVERING, Primary Examiner

U.S. Cl. X.R.

99—118 F, 140 R, 166; 117—62.1, 100 A, 100 B; 252—90, 522, DIG 12; 264—4; 424—33